United States Patent
Kavaler

(10) Patent No.: US 9,769,664 B1
(45) Date of Patent: Sep. 19, 2017

(54) NONCE SILENT AND REPLAY RESISTANT ENCRYPTION AND AUTHENTICATION WIRELESS SENSOR NETWORK

(71) Applicant: Sensys Networks, Inc., Berkeley, CA (US)

(72) Inventor: Robert Kavaler, Kensington, CA (US)

(73) Assignee: Sensys Networks, Berkeley, CA (US)

( * ) Notice: Subject to any disclaimer, the term of this patent is extended or adjusted under 35 U.S.C. 154(b) by 60 days.

(21) Appl. No.: 14/846,656

(22) Filed: Sep. 4, 2015

Related U.S. Application Data

(60) Provisional application No. 62/045,573, filed on Sep. 4, 2014.

(51) Int. Cl.
| | |
|---|---|
| *H04L 9/32* | (2006.01) |
| *H04L 9/08* | (2006.01) |
| *H04W 12/02* | (2009.01) |
| *H04W 12/06* | (2009.01) |
| *H04W 74/08* | (2009.01) |
| *H04L 29/06* | (2006.01) |
| *H04L 9/06* | (2006.01) |
| *H04W 84/18* | (2009.01) |

(52) U.S. Cl.
CPC .......... *H04W 12/06* (2013.01); *H04L 9/0618* (2013.01); *H04L 9/0631* (2013.01); *H04L 63/0428* (2013.01); *H04L 63/08* (2013.01); *H04W 74/0891* (2013.01); *H04W 84/18* (2013.01)

(58) Field of Classification Search
CPC ...................................................... H04W 84/18
USPC .......................... 713/168, 189; 380/259, 270
See application file for complete search history.

(56) References Cited

U.S. PATENT DOCUMENTS

| | | | |
|---|---|---|---|
| 2011/0158410 A1* | 6/2011 | Falk ...................... | H04L 9/3242 380/270 |
| 2011/0188656 A1* | 8/2011 | McCullough ............. | H04L 9/14 380/259 |
| 2015/0109902 A1* | 4/2015 | Kumar ................ | H04L 41/0668 370/219 |

* cited by examiner

*Primary Examiner* — Alexander Lagor
(74) *Attorney, Agent, or Firm* — Earle Jennings

(57) ABSTRACT

An access point and a sensor node are disclosed for use within a wireless sensor network. The wireless sensor network includes at least one access point adapted to securely communicate with at least one of the sensor nodes using an encryption mechanism that uses a nonce and an encryption key to encrypt the plaintext at the sensor node to create the cipher text included in the data payload of a message sent to the access point. The sensor node does not send the nonce. The access point uses the same nonce to decipher to the received message's data payload, but generates the nonce internally without receiving it from the sensor node.

18 Claims, 6 Drawing Sheets

Fig. 4A

| Representative Network communications activity | Example of estimated time slot value |
|---|---|
| Synch message 1 | Slot est 0 |
| Effective time slot 1 to N | Slot est 1 to N |
| Synch message 2 | Slot est 0 |
| Effective time slot N+1 to 2*N | Slot est 1 to N |
| Synch message ... | ... |
| Effective time slots ... | ... |
| Synch message K | Slot est 0 |
| Effective time slot K*N+1 to (K+1)*N | Slot est 1 to N |

Fig. 4B

| Representative Network communications activity | Example of counter value |
|---|---|
| Synch message 1 | Counter 1 |
| Effective time slot 1 to N | Counter 2 to N+1 |
| Synch message 2 | Counter N+2 |
| Effective time slot N+1 to 2*N | Counter N+3 to 2*N+2 |
| Synch message ... | ... |
| Effective time slots ... | ... |
| Synch message K | Counter K*(N+2) |
| Effective time slot K*N+1 to (K+1)*N | Counter K*(N+2)+1 to (K+1)*(N+2)-1 |

NONCE SILENT AND REPLAY RESISTANT ENCRYPTION AND AUTHENTICATION WIRELESS SENSOR NETWORK

TECHNICAL FIELD

This invention relates to encryption and authentication protocols for wireless sensor networks. In particular, wireless sensor networks including an access point and at least one, frequently more than one sensor nodes. The access point and the sensor node(s) communicate wirelessly. The communication between the sensor node and the access point is encrypted and authenticated using a nonce to reduce the opportunity for a replay attack to penetrate the encrypted communication from the sensor node(s) to the access point.

BACKGROUND OF THE INVENTION

In wireless communication networks involving sensors, a common paradigm is that of an access point and one or more sensor nodes, which act as clients of the access point. In some situations, the access point may be referred to as a server or base station, but here, the term access point will be used exclusively, even though the specific wireless sensor network technology may designate servers, base stations and/or access points.

In cryptography, a Message Authentication Code (MAC) refers to information that can authenticate a message, and possibly its source. Some MACs provide indications of whether a message has been changed since leaving its source.

A replay attack on an encrypted communication between an access point and a sensor node works by recording one or more communications from the sensor node to the access point and then replaying some or all the recorded communications to deceive the access point into believing the replayed communication is from the sensor node.

One prior art approach to thwarting replay attacks is for the sensor node to present a nonce (sometimes referred to as a number used once) to the access point to assert their authenticity. Alternatively, the access point may present a challenge to the sensor nodes that must be remembered for use in generating the nonce for subsequent communications to the access point. In most of these approaches, the nonce must be sent with the encrypted message from the sensor node. Frequently, the nonce may be 128 bits or more in length.

In most of these approaches, each of the sensor nodes maintains an independent counter that is incremented with each encrypted message the sensor node sends. The nonce, combined with the sensor node counter value and the encryption key are presented to an encryption mechanism and/or procedure to generate a encryption stream at the sensor node. The plaintext stream is additively altered by the encryption stream to create the cipher text that becomes the data payload of the message(s) sent by the sensor node. The additive alteration frequently is a form of the exclusive or operator.

The exclusive or operator (xor) has the property the A xor A=0. At the access point, the access point receives the encrypted data payload and the nonce from the sensor node. The access point maintains a mirror of the sensor node's counter, and when it has determined the sensor node that originated the message, it uses that mirrored counter, the nonce and the encryption key as inputs to a second encryption mechanism and/or procedure that generates a duplicate encryption stream which is additively applied to the cipher text of the received message's data payload to generate the original plain text from the sensor node.

SUMMARY OF THE INVENTION

Existing approaches to thwarting replay attacks in wireless sensor networks suffer from several technical problems:

Prior art approaches often require a counter based upon an initialization vector of unique, possibly random or pseudo-random entries. The counter must be remembered by each of the sensor nodes to generate future nonces. However, the sensor nodes typically use flash memories to store such counters, which have a limited number of reliable writes, often on the order of 10,000. If the sensor node writes the counter to flash memory once a second, the counter's stored value can become unreliable after about 3 hours.

Prior art approaches require that the access point maintain counter mirrors for each of its sensor nodes. If any of these counters fail to be properly maintained at both the sensor node and the access point, then the sensor node can no longer communicate securely to the access point and that communication needs to be reset. Resetting the security protocol often requires the access point to send a new encryption key, which can be observed by adversaries.

Sending a 16 byte (128 bit) nonce from the wireless sensor nodes with each encrypted message takes power that cannot be spent sending the data payload. In self-powered sensor nodes, this can diminish the overall reliability and longevity of these nodes, limiting the value of the wireless sensor network.

Various embodiments of the invention may solve one or more of these technical problems.

The apparatus includes an access point and/or a sensor node, each of which is adapted to wirelessly communicate within a wireless sensor network that may be constructed of these elements. The wireless sensor network includes at least one access point adapted to securely communicate with at least one of the sensor nodes using an encryption mechanism that uses a nonce and an encryption key to encrypt the plaintext at the sensor node to create the cipher text included in the data payload of the message sent to the access point. The sensor node does not send the nonce. The access point uses the same nonce to decipher the received message's data payload, but generates the nonce internally without receiving it from the sensor node.

The access point and sensor nodes may further share a single counter based upon an estimated time slot with respect to a synchronization message sent from the access point. By way of example, the counter may traverse the estimated time slots of multiple synchronization messages. This counter may be required by the sensor nodes and the access point to schedule transmission and/or reception of messages across the wireless physical transport of the wireless sensor network.

The access point may transmit a challenge bit sequence as part of at least some, possibly all, of the synchronization messages to the sensor nodes. The challenge bit sequence may be a random and/or pseudo-random bit sequence. The challenge bit sequence may be part of the nonce.

The access point may retain a list of sensor node identification numbers that are uniquely assigned and known by each of the sensor nodes. These unique sensor node identification numbers may also be part of the nonce.

Distinct combinations of the estimated time slot, the challenge bit sequence and the sensor node identification numbers may be used to create the nonce for different sensor nodes, and which may only be known by the access point and the sensor node.

The access point may retain a list of an encryption key for each of the sensor nodes. The sensor nodes may also retain their encryption key. Communication between the access point and the sensor node may employ this encryption key, so that even if traffic between one sensor node and the access point is decrypted, it does not follow that all the communication from other sensor nodes is insecure.

One skilled in the art will recognize that various encryption mechanisms and/or procedures may be employed by these wireless sensor networks, including but not limited to, block cipher systems using a nonce, such as the Advanced Encryption Standard (AES).

One skilled in the art will also recognize that most wireless communications standards, such as IEEE 802.15.4, Bluetooth and LTE include some form of synchronization message, irrespective of the other details of the communications protocol. For example, versions of IEEE 802.15.4 may use a Time Division Multiple Access (TDMA) communication scheme, which uses very explicit time slots. Bluetooth, while a time hopping and frequency hopping protocol relies upon an accurate shared time sense to schedule the hops in frequency and time for messages. LTE may employ various spread spectrum modulation/demodulation schemes, but again, relies upon a synchronization message often called a beacon.

BRIEF DESCRIPTION OF THE DRAWINGS

FIG. 4A and FIG. 4B show examples of representative network communications activity for the wireless sensor network showing one example of the estimated time slot value with and without regard for issues such as sending an updated encryption key.

DETAILED DESCRIPTION OF THE DRAWINGS

This invention relates to encryption and authentication protocols for wireless sensor networks. In particular, wireless sensor networks including an access point and at least one, frequently more than one sensor nodes. The access point and the sensor node(s) communicate wirelessly. The communication between the sensor node and the access point is encrypted and authenticated using a nonce to reduce the opportunity for a replay attack to penetrate the encrypted communication from the sensor node(s) to the access point.

An access point and a sensor node are disclosed for use within a wireless sensor network. The wireless sensor network includes at least one access point adapted to securely communicate with at least one of the sensor nodes using an encryption mechanism that uses a nonce and an encryption key to encrypt the plaintext at the sensor node to create the cipher text included in the data payload of a message sent to the access point. The sensor node does not send the nonce. The access point uses the same nonce to decipher to the received message's data payload, but generates the nonce internally without receiving it from the sensor node.

Figure 1:
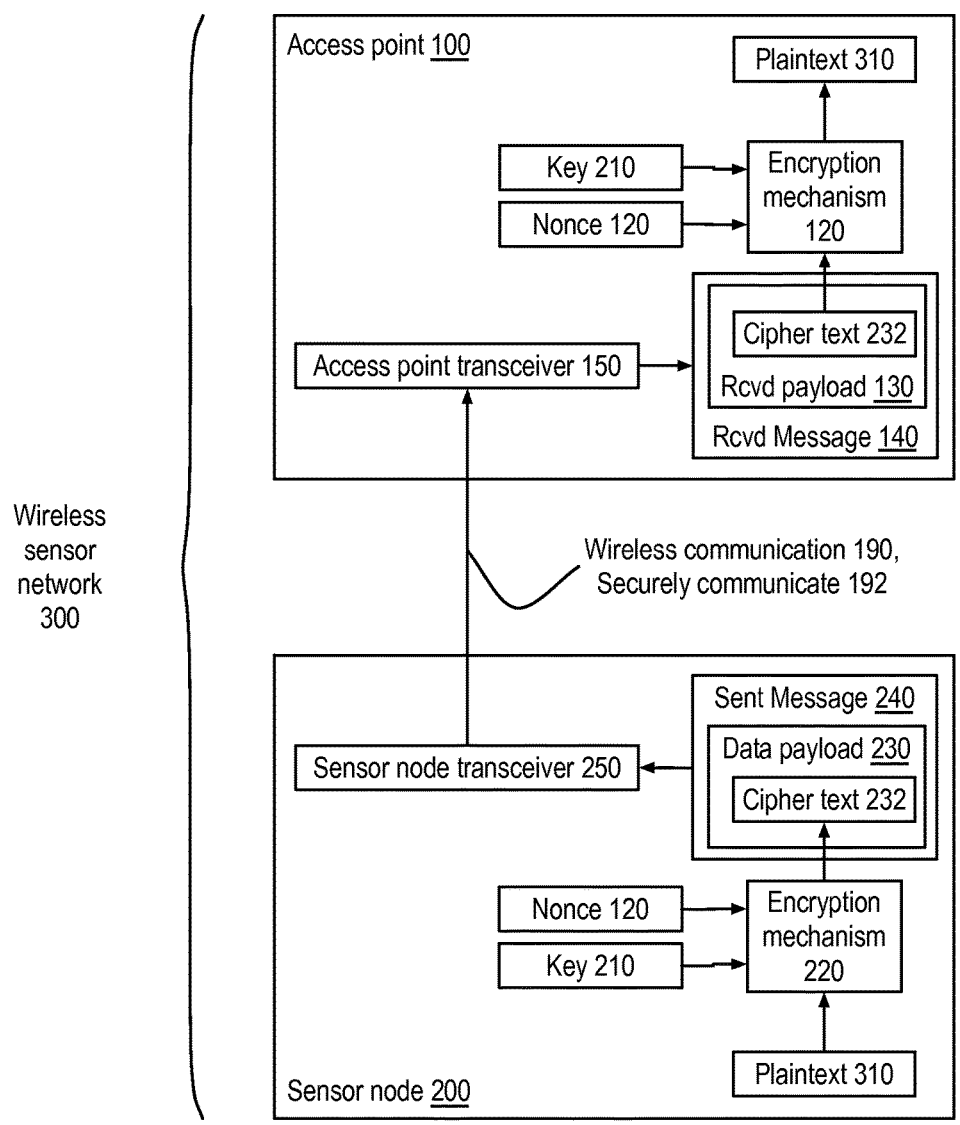
FIG. 1 shows an example of the apparatus including an access point and/or a sensor node, each of which is adapted to wirelessly communicate within a wireless sensor network. The access point securely communicates with at least one of the sensor nodes using an encryption mechanism that uses a nonce and an encryption key to encrypt plaintext at the sensor node to create the cipher text included in the data payload of a message sent to the access point. The sensor node does not send the nonce. The access point uses the same nonce to decipher the received message, but generates the nonce internally without receiving it from the sensor node.

Referring more specifically to the Figures, FIG. 1 shows an example of the apparatus including an access point 100 and/or a sensor node 100, each of which is adapted to wirelessly communicate 190 within a wireless sensor network 300 that may be constructed of these elements. The wireless sensor network 300 includes at least one access point 100 adapted to securely communicate 192 with at least one of the sensor nodes 100 using an encryption mechanism 220 that uses a nonce 120 and an encryption key 210 to encrypt plaintext 310 at the sensor node to create the cipher text 232 included in the data payload 230 of a message 240 sent by the sensor node transceiver 250 to the access point 100. The sensor node 200 does not send the nonce 120. The access point 100 uses the same nonce 120 to decipher the received message's 140 data payload 130 containing the cipher text 232 to create the plaintext 310, but generates the nonce 120 internally without receiving it from the sensor node 200.

One skilled in the art will recognize that wireless communications 190 often involve noisy communication channels and that data payloads 140 and 240 are often further encoded with error detecting and possibly error correcting coding schemes. Such coding schemes, while quite useful, are not the topic of this invention and will not be discussed further. Suffice it to say, the data payloads 140 and/or 240 include the cipher text 232, but may also include other information such as an error detecting and/or correcting component.

In the drawings and discussions that follow, the nonce 120 will be discussed in terms of several components that may be combined in various ways for generate the nonce. These components are discussed in their simplest format, strictly to improve the clarity of disclosure. One skilled in the art will recognize that these components are almost always used in combination. By way of example, the estimated time slot 160 and/or 260, the challenge bit sequence 172, selections from the challenge history 180, which may be selected based upon a challenge index 282 or a small set of attempted decryptions using recent challenge bit sequences and possibly a check sum sent with the message, as well as the sensor identification 282, all of which are shown and discussed with regards to the following Figures.

Figure 2:
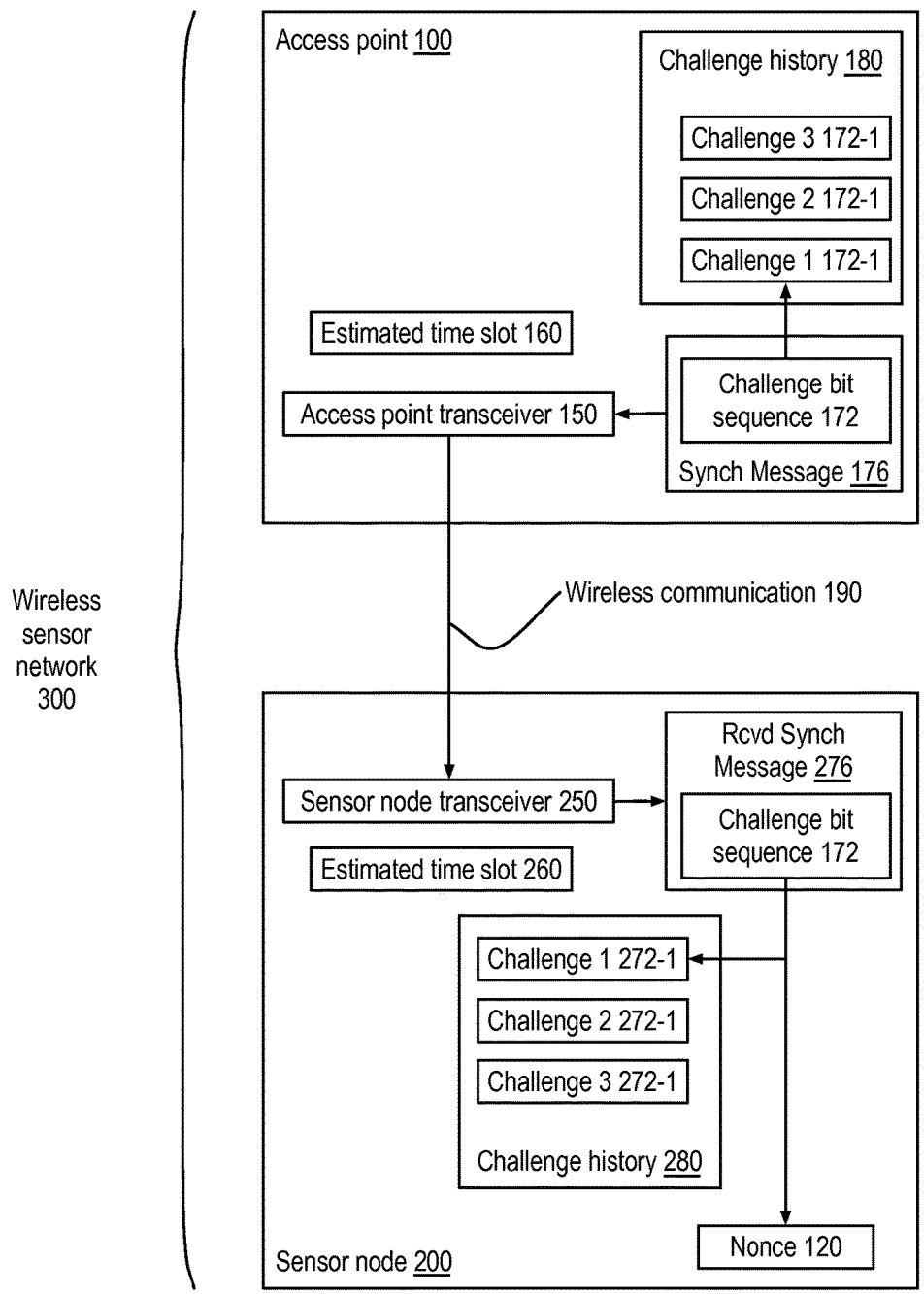
FIG. 2 shows an example of the wireless sensor network of FIG. 1 in which the access point generates a synchronization message sent to the sensor node. Both the access point and the sensor node may internally generate an estimated time slot. The synchronization message may include a challenge bit sequence used to at least partially generate the nonce.

FIG. 2 shows an example of the wireless sensor network 300 of FIG. 1 in which the access point 100 generates a synchronization message 176 which is sent by the access point transceiver 150 to the sensor node 200, where it is received by the sensor node transceiver 250 to create the received synchronization message 276. Both the access point 100 and the sensor node 200 may internally generate an estimated time slot. The access point 100 may generate the estimated time slot 160. The sensor node 200 may generate the estimated time slot 260.

One skilled in the art will also recognize that most wireless communications standards, such as IEEE 802.15.4, Bluetooth and LTE include some form of synchronization message 176, irrespective of the other details of the communications protocol. For example, versions of IEEE 802.15.4 may use a Time Division Multiple Access (TDMA) communication scheme, which uses very explicit time slots. Bluetooth, while a time hopping and frequency hopping protocol relies upon an accurate shared time sense to schedule the hops in frequency and time for messages. LTE may employ various spread spectrum modulation/demodulation schemes, but again, relies upon a synchronization message 176 often called a beacon.

The estimated time slot 160 and/or 260 may account for the effective time slots relevant for the communications protocol being implemented by the wireless sensor network 300. For example, some wireless sensor networks 300 may employ 512 time slots including the synchronization message 176 time slot. Others may employ 1024 or an odd number such as 343 effective time slots.

The synchronization message 176 and the received synchronization message 276 may further include a challenge bit sequence 172 which may at least partly determine the nonce 120. In some embodiments, the challenge bit sequence may be at least 16 bits in length, however it is preferred to be longer, such as 28 bits. Note that in some situations every synchronization message 176 may include a new and different challenge bit sequence 172.

In some further embodiments, the access point 100 and the sensor node 200 may operate to maintain a challenge history 180 in the access point and the sensor challenge history 280 in the sensor node respectively.

Figure 3:
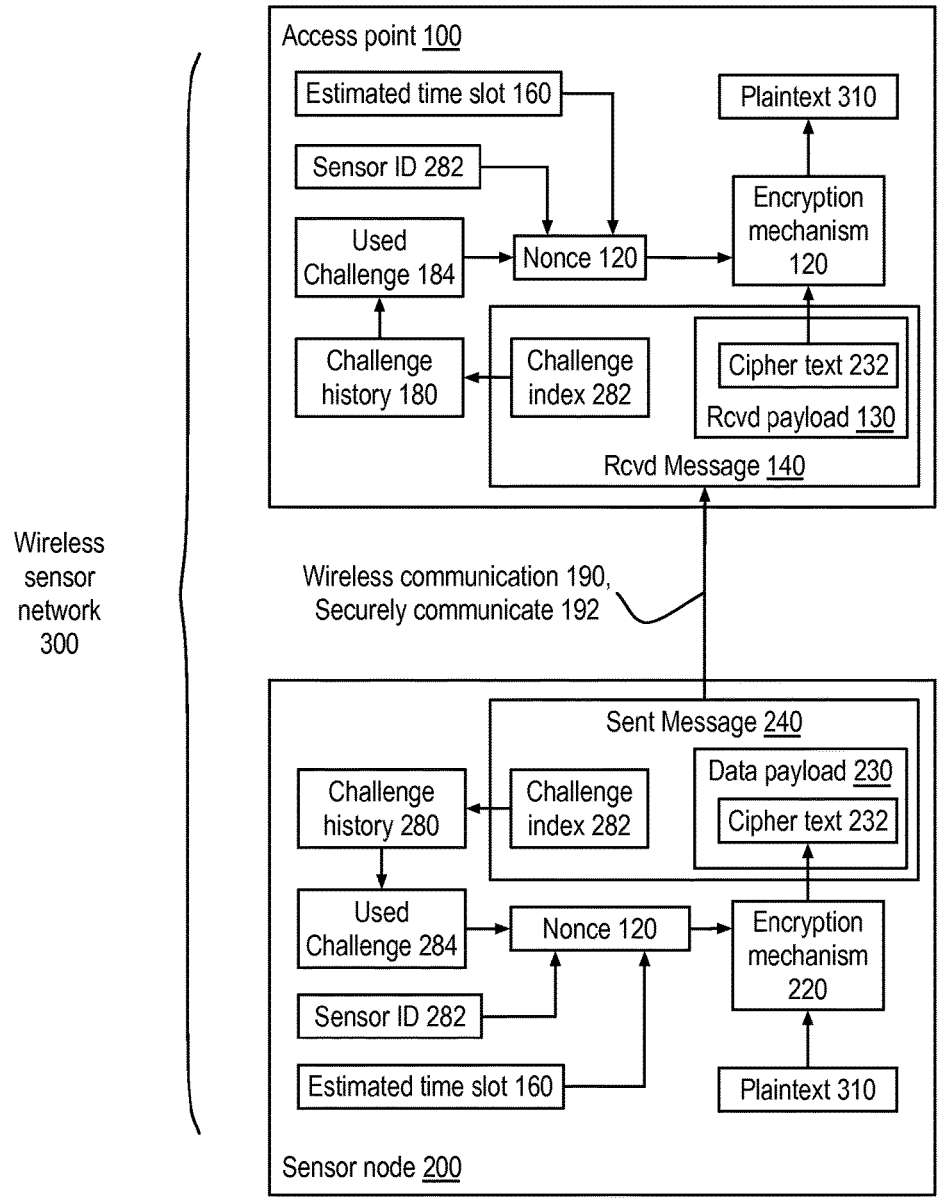
FIG. 3 shows an example of the wireless sensor network further operating based upon the challenge histories to further encrypt the message sent from the sensor node by embedding in the sent message a challenge index.

FIG. 3 shows an example of the wireless sensor network 300 further operating based upon the challenge histories 180 and 280 to further encrypt the message 240 sent from the sensor node 200 by embedding in the sent message a challenge index 282. The challenge index 282 indicates an entry in the challenge history referred to as the used challenge 284 to generate the nonce 120.

The access point 100 responds to the message 240 wirelessly sent by the sensor node 200 by creating the received message 140 which includes not only the received payload 130 with the cipher text 232, but also the challenge index 282. The access point 100 responds to the challenge index 282 to access the challenge history 180 to generate the used challenge 184. The nonce 120 is generated by the access point 100 from the used challenge 184.

FIG. 3 also shows the estimated time slot 160 being used to generate the nonce 120. In some embodiments, the sensor identification 282, which is shown and discussed in further detail with regards to FIG. 6, may also be used to generate the nonce 120.

FIG. 4A shows an example of representative network communications activity for the wireless sensor network 300 showing one example of the estimated time slot value without regard for issues such as sending an updated encryption key 210.

FIG. 4B shows an example of the representative network communications activity now showing a counter traversing the effective time slots of multiple cycles of synchronization messages being sent from the access point 100. Note that in situations where the effective number of time slots including the synchronization message time slot is a power of two, if the number of cycles of these time slots is also a power of two, a very efficient implementation of the counter can be implemented based strictly upon this extension of the estimate time slot 160 and 260.

Figure 5:
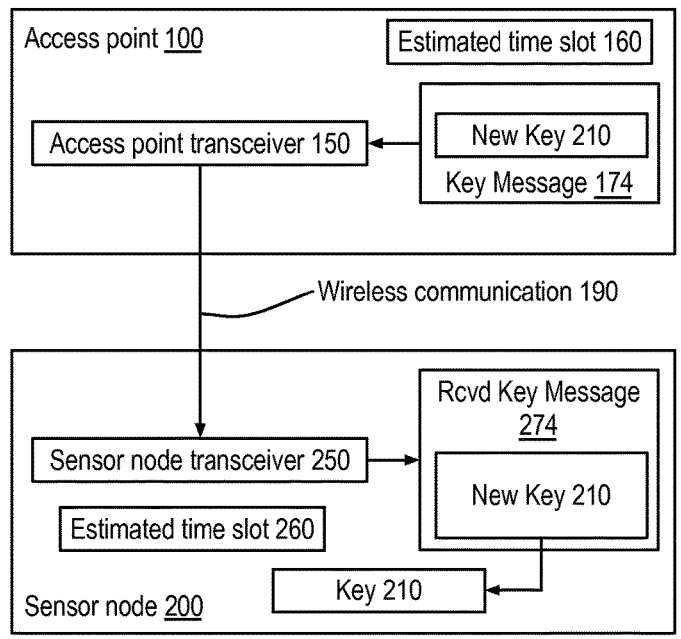
FIG. 5 shows an example of the wireless sensor network 300 where the estimated time slot indicates that counter may roll over soon, which would cause the nonce to be repeated, thereby rendering the secure communication vulnerable.

FIG. 5 shows an example of the wireless sensor network 300 where the estimated time slot 160 indicates that counter may roll over soon, which would cause the nonce 120 to be repeated, thereby rendering the secure communication 192 vulnerable. In this situation, the access point 100 may generate and send a key message 174 through the access point transceiver 150 to the sensor node 200. The sensor node transceiver 250 may respond to the sent key message 174 to create a received key message 274 with the new key 210. The access point 100 and the sensor node 200 may respond to the new key 210 by using it as the encryption key 210 in subsequent secure communications from the sensor node 200.

Figure 6:
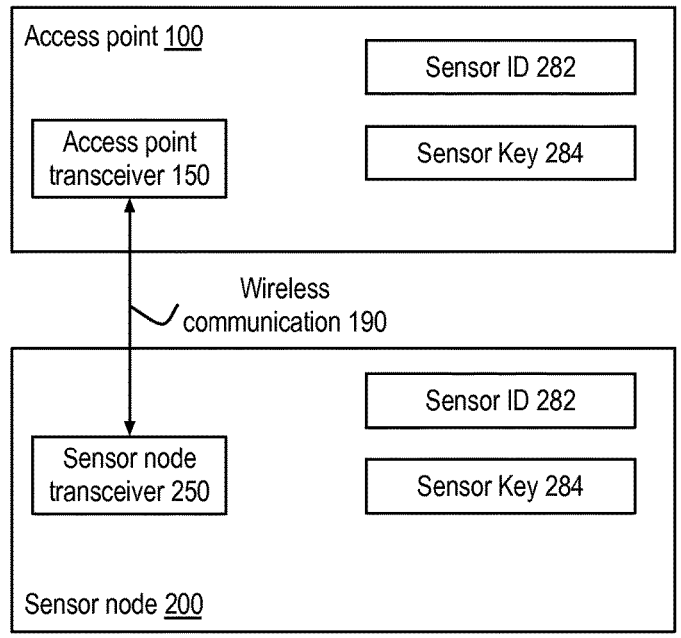
FIG. 6 shows an example of communications between the access point and the sensor node may be based upon a sensor identification and/or a sensor key.

FIG. 6 shows an example of communications between the access point 100 and the sensor node 200 may be based upon a sensor identification 282 and/or a sensor key 284. The sensor identification 282 may be used to generate the nonce 120. The sensor identification 282 may be installed into the access point 100 when the sensor node 200 is installed and configuring to communicate within the wireless sensor network 300. Note that the sensor key 284 may also be initialized for the access point 100 and the sensor node 200 to have a specific, unique channel of secure communications 192 the may differ from one sensor node to another.

Figure 7:
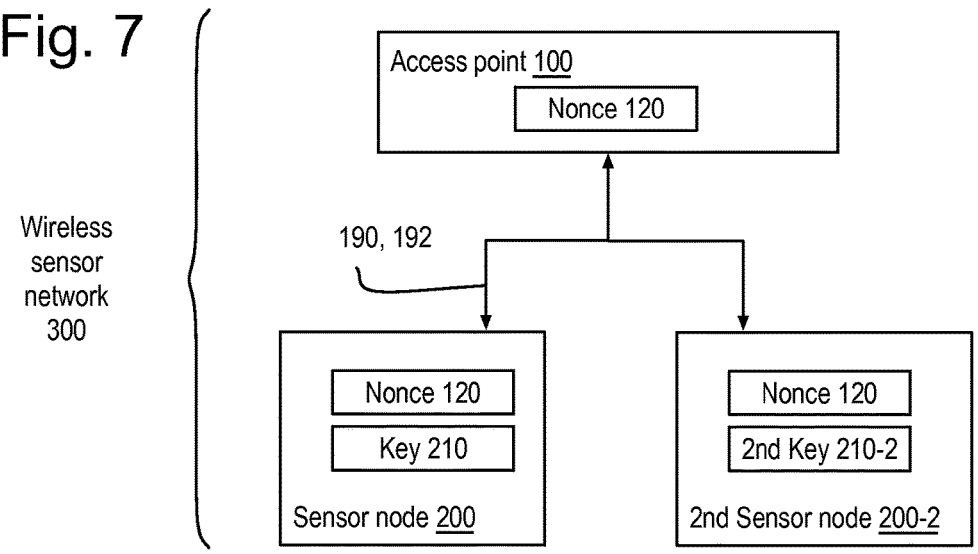
FIG. 7 shows an example of the access point wirelessly and securely communicating with the sensor node of previous Figures and a second sensor node, again using the nonce, but never communicating the nonce between the sensor nodes and the access point.

FIG. 7 shows an example of the access point 100 wirelessly 190 and securely 192 communicating with the sensor node 200 of previous Figures and a second sensor node 200-2, again using the nonce 120, but never communicating the nonce between the sensor nodes 200 and 200-2 and the access point 100. Note that in some situations, the second sensor node 200-2 may use a second encryption key 210-2 which may differ from the encryption key 210. In such situations, the access point will also maintain the second encryption key 210-2, which has not been shown.

Figure 8:
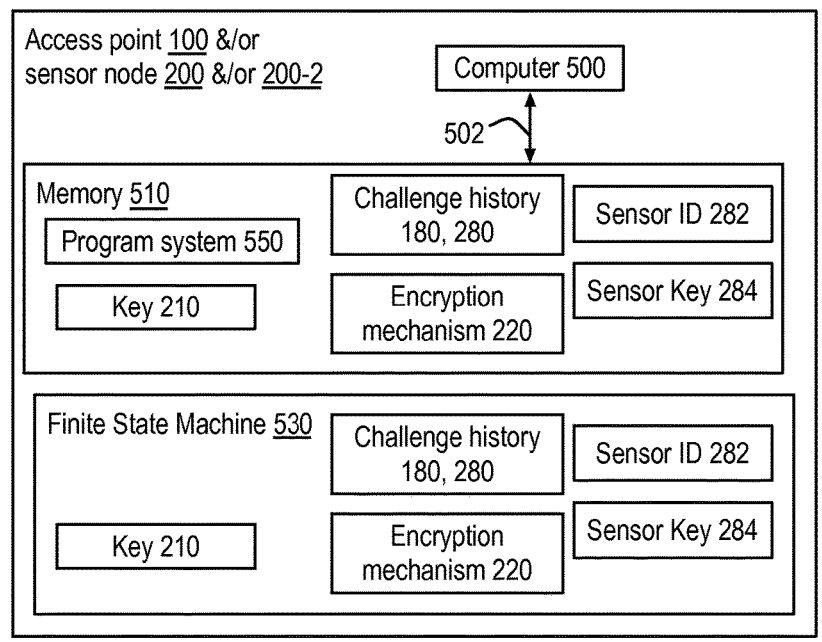
FIG. 8 shows that the access point 100 and/or at least one of the sensor nodes 200 and/or 200-2 may include a computer 500, possibly coupled 502 to a memory 510 and/or a finite state machine 530. The memory 510 may include computer readable, non-volatile and/or volatile memory components. The memory 510 and/or the finite state machine 530 may implement any combination of the key 210, the encryption mechanism 220, the challenge history 180 and/or 280, the sensor identification 282 and/or the sensor encryption key 284. The memory 510 may contain a program system 550, which may be configured to instruct the computer 500.

FIG. 8 shows that the access point 100 and/or at least one of the sensor nodes 200 and/or 200-2 may include a computer 500, possibly coupled 502 to a memory 510 and/or a finite state machine 530. The memory 510 may include computer readable, non-volatile and/or volatile memory components. The memory 510 and/or the finite state machine 530 may implement any combination of the key 210, the encryption mechanism 220, the challenge history 180 and/or 280, the sensor identification 282 and/or the sensor encryption key 284. The memory 510 may contain a program system 550, which may be configured to instruct the computer 500.

As used herein, a memory 510 component may be computer readable if a computer 500 may be configured to read the memory. A memory component may be non-volatile if the contents of the component are retained without additional power being required to retain the contents after it is written. A memory component may be volatile if the contents of the component cannot retained without additional power being required to retain the contents after it is written. Note that some non-volatile memories include flash memories, some of which can be written only a relatively small number of times, such as 10,000, before retention of the written data may become unreliable.

As used herein, a computer includes at least one instruction processor and at least one data processor, wherein the data processor responds to at least one instruction generated by at least one of the instruction processors to implement at least part of structure and/or functions of this invention.

As used herein, a finite state machine includes at least one input and generates at least one output and often maintains at least one internal state, wherein the value of an output is in response to the value of an input and/or the value of at least one internal state.

The program system 500 may include at least one of the program steps of operating the access point 100 to respond to wireless receipt of the message including the cipher text 232 to decrypt the cipher text 232 with the nonce 120 without receiving the nonce 120 from the sensor node 200; and/or operating the sensor node 200 to wirelessly send the message to the access point 100 without sending the nonce 120 to the access point 100.

The program system 500 may further include at least one of the program steps of operating the access point 100 to wirelessly send a synchronization message 176 to the sensor node 200 to share a estimated time slot between the access point 100 and the sensor node 200; operating the sensor node 200 in response to wirelessly receiving the synchronization message 176 to create and/or maintain the estimated time slot; operating the access point 100 to generate the nonce 120 using the estimated time slot; and/or operating the sensor node 200 to generate the nonce 120 using the estimated time slot.

The program system 500 may further include at least one of the program steps of operating the access point 100 to inject a challenge bit sequence 172 into the synchronization message 176 wirelessly sent to the sensor node 200; operating the sensor node 200 to generate the nonce 120 in response to the challenge bit sequence 172; and/or operating the access point 100 to generate the nonce 120 in response to the challenge bit sequence 172.

The preceding discussion serves to provide examples of the embodiments and is not meant to constrain the scope of the following claims.

The invention claimed is:

1. An apparatus, comprising:
    an access point adapted to wirelessly communicate with at least one sensor node and configured to receive a message from said sensor node including an cipher text generated by a nonce from a plaintext and to decrypt said cipher text with said nonce to create said plaintext in said access point without receiving said nonce from said sensor node, wherein said message includes an index to a list of recent challenge bit sequences to identify one of said recent challenge bit sequences used to generate said nonce;
    said access point is further configured to send a synchronization message to said sensor node to alter said nonce at said sensor node, where at least one of said synchronization message includes a challenge bit sequence cryptographically used to alter said nonce;
    said sensor node configured to generate and wirelessly send said message based upon said nonce without sending said nonce to said access point;
    said sensor node is further configured to respond to receiving said synchronization message by extracting a challenge bit sequence to cryptographically alter said nonce;
    wherein said cryptographically alter is non-incremental; and
    a wireless sensor network including said access point and said sensor node both configured to wirelessly communicate said message from said sensor node to said access point without said nonce being communicated from said sensor node to said access point.

2. The apparatus of claim 1, wherein said wireless sensor network includes more than one of said sensor nodes adapted and configured to wirelessly communicate with said access point.

3. The apparatus of claim 1, wherein said access point and said sensor node each operate a counter to further generate said nonce.

4. The apparatus of claim 3, wherein said counter is operated to create a estimated time slot based upon a synchronization message sent by said access point to at least said sensor node.

5. The apparatus of claim 4, wherein said sensor node responds to said estimated time slot by determining when to wirelessly transmit to and when to wirelessly receive from said access point.

6. The apparatus of claim 4, further comprising
    said access point transmitting said challenge bit sequence with at least one of said synchronization message; and
    wherein said nonce is based upon said challenge bit sequence.

7. The apparatus of claim 6, wherein said access point transmits said challenge bit sequence with each of said synchronization messages.

8. The apparatus of claim 1, wherein said nonce is based upon a sensor node identification of said sensor node;
    said apparatus further comprising said access point configured to retain said sensor node identification.

9. The apparatus of claim 8, a combination of an estimated time slot, said challenge bit sequence and said sensor node identification is used to generate said nonce may be distinct for each of said sensor node configured to securely communicate with said access point.

10. The apparatus of claim 1, wherein said access point and said sensor node are both configured to maintain a first encryption key for secure communication between said access point and said sensor node distinct from a second encryption key maintained by said access point and a second of said sensor node for second communication between said access point and said second of said sensor node.

11. The apparatus of claim 1, further comprising
    said access point further comprising one of
    said access point configured to operate an encryption mechanism to generate said plaintext from said cipher text based upon said nonce; and said access point configured to operate an encryption procedure to generate said plaintext from said cypher text based upon said nonce; and said sensor node further comprising one of said sensor node configured to operate a second encryption mechanism to generate said cipher text from said plaintext based upon said nonce, and said sensor node configured to operate a second encryption procedure to generate said cypher text from said plaintext based upon said nonce.

12. The apparatus of claim 11, wherein at least one of said encryption mechanism, said second encryption mechanism, said encryption procedure and/or said second encryption procedure may implement a block cipher system.

13. The apparatus of claim 12, wherein said block cipher system may implement a version of an Advanced Encryption Standard (AES).

14. The apparatus of claim 1, wherein wireless sensor network complies with at least one wireless communications protocol employing said synchronization message.

15. The apparatus of claim 1, wherein at least one of said access point and said sensor node includes at least one of a computer, a finite state machine, an essentially non-volatile memory, a writable non-volatile memory and said computer accessible coupled to a memory containing a program system configured to instruct said computer.

16. The apparatus of claim 15, wherein said program system includes at least one of the program steps of:

operating said access point to respond to wireless receipt of said message including said cipher text to decrypt said cipher text with said nonce without receiving said nonce from said sensor node; and operating said sensor node to wirelessly send said message to said access point without sending said nonce to said access point.

17. The apparatus of claim 16, wherein said program system further includes at least one of the program steps of:

operating said access point to wirelessly send a synchronization message to said sensor node to share an estimated time slot between said access point and said sensor node;

operating said sensor node in response to wirelessly receiving said synchronization message to create and/or maintain said estimated time slot;

operating said access point to generate said nonce using said estimated time slot; and operating said sensor node to generate said nonce using said estimated time slot.

18. The apparatus of claim 17, wherein said program system further includes at least one of the program steps of:

operating said access point to inject a challenge bit sequence into said synchronization message wirelessly sent to said sensor node;

operating said sensor node to generate said nonce in response to said challenge bit sequence; and operating said access point to generate said nonce in response to said challenge bit sequence.

* * * * *